United States Patent [19]

Greenbaum

[11] 3,987,585
[45] Oct. 26, 1976

[54] MODULAR CHANNEL CULTURE DEVICE
[76] Inventor: George Greenbaum, 790 Boylston St., Boston, Mass. 02199
[22] Filed: Oct. 23, 1975
[21] Appl. No.: 625,254

[52] U.S. Cl. .......................................... 47/34.13
[51] Int. Cl.² ........................................ A01G 9/00
[58] Field of Search ................ 47/1.2, 14, 15, 16, 47/33, 37, 34.11, 34.13, 38

[56] References Cited
UNITED STATES PATENTS

| | | | |
|---|---|---|---|
| 1,067,556 | 7/1913 | Schmidt et al. | 47/15 |
| 1,172,787 | 2/1916 | Gray | 47/14 |
| 2,039,442 | 5/1936 | Mulford | 47/37 |
| 2,318,711 | 5/1943 | Phelan | 47/34.13 |
| 2,867,946 | 1/1959 | Kobs | 47/34.13 |
| 3,396,488 | 8/1968 | Ries | 47/33 |
| 3,788,002 | 1/1974 | Suchka | 47/34.13 |
| 3,849,932 | 11/1974 | Adams | 47/37 |

FOREIGN PATENTS OR APPLICATIONS

| | | | |
|---|---|---|---|
| 893,145 | 5/1947 | France | 47/14 |
| 7,014,511 | 4/1971 | Netherlands | 47/1.2 |
| 668,757 | 3/1952 | United Kingdom | 47/38 |
| 737,660 | 9/1955 | United Kingdom | 47/34.13 |
| 1,384,981 | 2/1975 | United Kingdom | 47/34.13 |

Primary Examiner—Edgar S. Burr
Assistant Examiner—James R. Feyrer
Attorney, Agent, or Firm—William L. Ericson

[57] ABSTRACT

A modular device for cultivating plants in channels containing isolated soil systems comprises longitudinally-folded sheets of material forming one or more center support members and a pair of edge support members. Each of the center supports has a series of alternately-inclined segments connected by upper and lower reverse bends parallel to its edges, while each of the edge supports has the form of a triangular prism or truss with one edge portion extending exteriorly of the prism. The edge supports are spaced apart on a surface in parallel relation, with their extended edges confronting, and the center support rests between them and on top of their extended edges. This forms a soil channel which may be extended longitudinally to any desired length by adding further similar structures end-to-end, and which may be subdivided laterally either by extending the inclined segments of the center support above the soil surface, or by adding partition panels. The prismatic form of the edge supports effectively resists lateral pressure of the soil to maintain structural stability.

11 Claims, 10 Drawing Figures

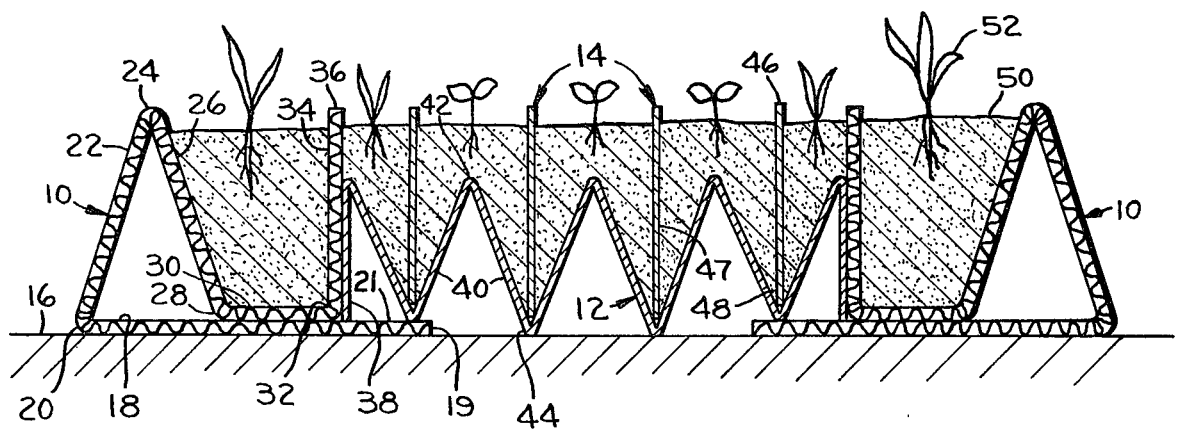
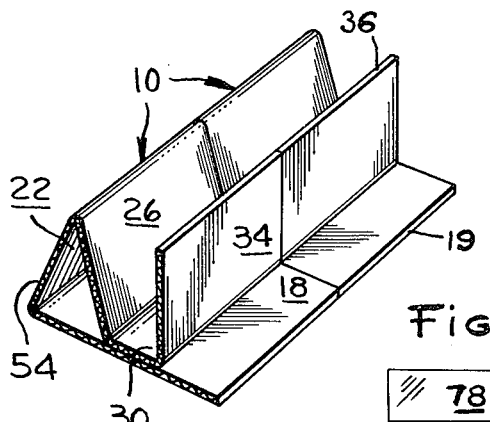
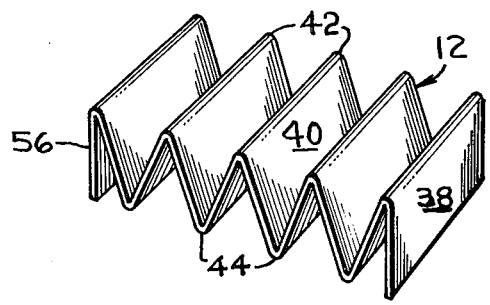
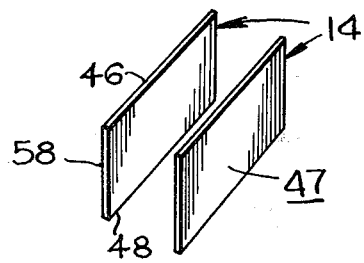
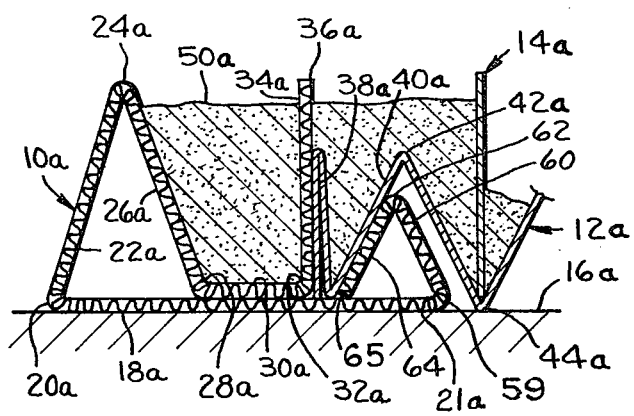
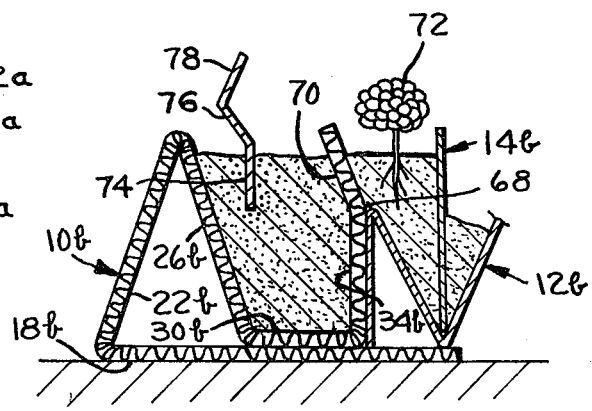

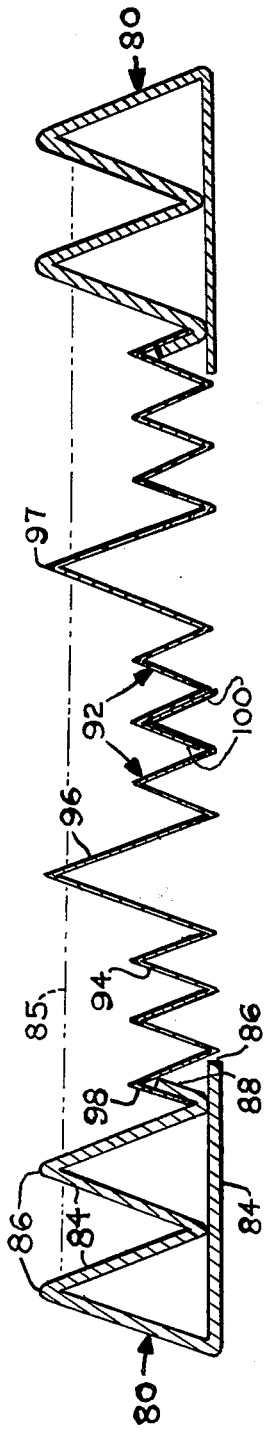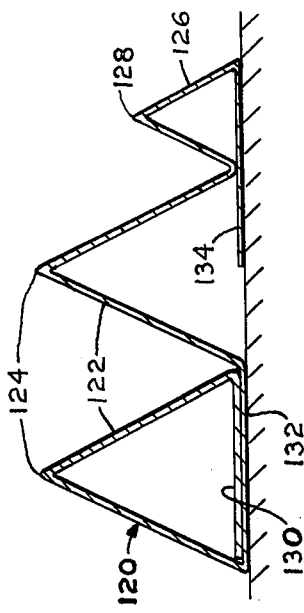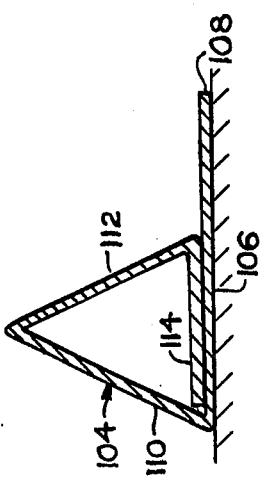

3,987,585

MODULAR CHANNEL CULTURE DEVICE

BACKGROUND OF THE INVENTION

Channel culture devices, which provide multiple plant growth channels of indefinite length but of shallow depth and narrow individual width, have enormous potential value for increasing the world's food supply. They provide maximum plant production for a given supply of fertile soil, water, fertilizer, and insecticide, some or all of which are scarce and at an extreme premium in many parts of the world. The growth channels have a limited cross-sectional area that can be made just sufficient for the full root development of any specified plant, so that optimum availability of nutrients and water to the plants is obtained. Further, the isolation of the channels prevents the leaching and escape of the available supply of nutrients and water into the underlying soil. Isolation also simplifies the problems of cultivation, and of the control of pests, disease, and weeds.

The difficulty that must be overcome before channel culture devices can be widely used is the cost, and in many needful parts of the world the scarcity, of materials for their construction. Various design proposals have been made, of which some are disclosed and claimed in my copending U.S. patent application, Ser. No. 512,518, filed Oct. 7, 1974, for "Channel Culture Device." The ideal structure would be easy to set up quickly without skilled labor, would require only locally-available materials or light-weight materials easy to transport, and would be as cheap as possible. At the same time, the device must have structural stability so that it will not collapse under the weight of soil and water it contains.

It is the general object of this invention to provide an improved channel culture device, which employs nothing but light sheet material for its construction, requires no fasteners or anchors, and yet affords adequate structural stability and integrity for its purpose. It is a further and more specific object to improve the structural resistance of such a device to the large lateral forces that can be imposed by the outward pressure of wet soil, without resorting to braces, fasteners, or heavy structural members, but using only light sheet materials such as corrugated cardboard, plastic, or sheet metal.

DESCRIPTION OF THE DRAWINGS

While the specification concludes with claims particularly pointing out the subject matter which I regard as my invention, it is believed that a clearer understanding may be gained from the following description of preferred embodiments, referring to the accompanying drawings, in which:

FIG. 1 is a view in end elevation of a first form of the improved modular channel culture device;

FIG. 2 is a pictorial view showing two edge support members of the device of FIG. 1 arranged in end-to-end relation, to illustrate the method of extending the device to any desired length;

FIG. 3 is a pictorial view of a center support member of the device of FIG. 1;

FIG. 4 is a pictorial view of a pair of the partitions used to subdivide soil channels in FIG. 1;

FIG. 5 is a fragmentary view in end elevation of a modified form of the improved device;

FIG. 6 is a fragmentary view in end elevation showing another modification, together with a reflector device;

FIG. 7 is a view in front elevation of the reflector device of FIG. 6;

FIG. 8 is a view in end elevation of another form of the improved device;

FIG. 9 is an end view of a modified edge support member comprising one element of the device; and FIG. 10 is an end view of another modified edge support member.

DESCRIPTION OF THE PREFERRED EMBODIMENTS

Referring to FIG. 1, a first form of the improved modular channel culture device comprises a pair of edge support members 10, a center support member 12, and a series of upstanding partition panels 14, these elements being individually illustrated in FIGS. 2–4. Each of the edge and center support members is folded from a single sheet of material, which may be corrugated cardboard, plastic, metal or any other desired material, and must have sufficient strength and waterproof quality to support the lateral and vertical loads of a quantity of soil 50 which the device is intended to contain and support.

Each edge support member 10 is folded longitudinally at a series of fold lines parallel to its lateral edges 19 and 36, to form between these edges a vertical separator segment 34, a bend 32, a horizontal segment 30, a bend 28, a triangular prism defined by oppositely-inclined side wall segments 22 and 26 joined by an apex bend 24, and a base segment 18 connected by a bend 20 and extending in a lateral direction beyond its intersection with the side wall 26 into an extended edge portion 21.

The pair of edge supports 10 is set on a supporting surface 16 in parallel relation, with the lateral edges 19 confronting one another. The center support member 12 is corrugated or folded longitudinally along parallel upper reverse bends 42 and lower reverse bends 44 to form a series of upstanding alternately-inclined intermediate segments 40 and edge segments 38, which form triangular sections when set up. The center support 12 is laid between the edge supports 10 to overly the extended edge portions 21.

A quantity of soil or other plant support medium 50, and plants 52, are placed in the various longitudinal channels formed between the opposed segments 34 of the two edge supports 10, and between these segments and segments 26 of both edge supports. The level is lower than the edges 36 and bends 24. The major channel overlying the center support is subdivided, to the extent desired for separating the roots of the plants, by placing upstanding partitions 14 in the lower bends 44 as the soil is poured in. The partitions 14 are rectangular, having upper edges 46 and lower edges 48 which are parallel to the edges 19 and 36, and extend above the soil level like the edge 36 and the apex bends 24.

The central channel between the edge supports may be extended to a greater width by adding more of the center supports in laterally-overlapping relation, as shown in FIG. 8. A series of the modular devices thus formed can be placed end-to-end to extend to any desired length, as suggested in FIG. 2, and the longitudinal ends 54, 56, and 58 all lie in planes perpendicular to the edges 19 and 36 to prevent leakage of the soil from between these ends. The mating ends may also be overlapped longitudinally, and sealing material may be applied to the lap joints if desired, to make this leak prevention more certain.

The triangular truss or prism formed by the edge support member 10 resists the lateral load of the soil with great effectiveness, especially in relation to the weight and bending strength of the sheet material used in this member, which may be rather light. Also, the weight of the soil is used to actual structural advantage, in that it anchors the extended edge portions 21, holding the edge support members firmly against shifting laterally outwardly. This firm anchoring also restrains the center support member 12 against outward expansion, and thereby resists its collapse under the weight of the soil. The spaced voids under the center support member represent a reduction in total soil weight for a given planting area, but there is still ample room for root development between the upper bends 42. These features combine to afford a device of improved stability.

A modification of the edge support members 10a is shown in FIG. 5, in which elements similar to those of the preceding embodiment are similarly numbered, but with subscripts a. Here, the extended edge portion 21a is folded along parallel bends 59 and 62 to form a second triangular prism having oppositely-inclined side wall segments 60 and 64, and terminates in an edge 65 resting against the base segment 18a. The lateral edge segment 38a and two of the intermediate segments 40a of the center support 12a are lapped over the second prism, and thus locked in place. This arrangement adds increased resistance against any laterally-inward displacement of the center support 12a by the weight of the soil, and thus increases the stability of the device.

In FIG. 6, a variation is shown in which the upper portion 70 of the separator segment 34b is bent outwardly from a fold line 68, to funnel additional rainwater to a row of plants 72, and thereby help to offset any tendency of thick foliage to deflect rain out of the growth channel of these plants. Parts similar to those of preceding embodiments are similarly numbered, with subscripts b.

An additional feature shown in FIGS. 6 and 7 is a reflector panel 74, made of waterproof corrugated board, metal, or plastic, and having a light-reflecting coating. This panel is bent to form segments 76 and 78, so angled as to deflect sunlight onto the bases of the plants 72. A series of the panels 74, of any desired length and number, are simply pressed into the soil in appropriate positions relative to the plants.

FIG. 8 shows a modification in which partitioning of the growth channels is obtained by folding the center support members 92, of which two are shown in this example, each with bends that form one or more upstanding triangular sections 96 of greater height than the remaining triangular sections 94, and of approximately the same height as the apex bends 86 of a pair of edge support members 80. Thus the apex bends 97 subdivide the soil, whose approximate proper level is indicated at 85, into a series of separate channels without the use of the separate partitions 14 used in the preceding embodiment. Inner edge segments 100 of the two center supports 92 are overlapped to prevent them from separating laterally, and to seal the bottom of the soil channel.

The edge support members 80 are modified to have two sets of alternately-inclined side walls 84, providing an additional soil channel between them, as well as a double triangular truss or prism for resisting lateral soil pressure. One edge of the sheet forming each support 80 extends into an inclined locking segment 88, over which an outer edge segment 98 of the adjacent center support 92 is lapped to resist laterally-inward separation of the latter. The locking segment 88 rests on an extended inner edge portion 86 of the base segment 84.

Another variation of the edge support members is shown at 104 in FIG. 9, and includes a pair of oppositely-inclined side wall segments 110 and 112, a base segment 106 having an extended edge portion 108, and an additional internal horizontal segment 114, which increases the structural stability of the triangular prism against lateral soil pressure.

FIG. 10 shows another form of edge support member 120, which has two pairs of alternately-inclined side walls 122 having apices 124 of full height, like those of FIG. 8, and a third pair of alternately-inclined side walls 126 having an apex 128 of lower height for interlocking engagement with a center support member (not shown) in a manner similar to that of FIG. 5. Here, the edge portions of the sheet from which the member 120 is folded are formed into an internal horizontal segment 130 which rests on a first base segment 132, and an extended edge portion 134 that is anchored by the weight of soil (not shown) that rests on the center and edge supports when the device is in use.

What I claim is:

1. A modular channel culture device comprising, in combination:

a center support member comprising a sheet of material folded longitudinally to form alternately-inclined segments connected by parallel linear upper and lower reverse bends, said center support member terminating in lateral edges parallel to said reverse bends;

a pair of edge support members each comprising a sheet of material folded longitudinally into the form of at least one triangular prism and having segments including a base and two inclined side walls, said side walls converging upwardly and meeting in a linear apex bend, said base segment extending in one lateral direction beyond its intersection with one of said inclined side walls to form an extended edge portion;

said edge support members being arranged in laterally-spaced relation, with said base segments thereof resting on a supporting surface, said apex bends thereof spaced above said supporting surface and being substantially parallel to one another, and said extended edge portions thereof in mutually-confronting relation;

said center support member being received between said edge support members with said lower reverse bends thereof resting on said supporting surface and on said extended edge portions of said edge support members, and said upper reverse bends thereof spaced above said supporting surface and extending in substantial parallelism to said apex bends of said edge support members;

said modular device forming at least one longitudinal soil channel therein adapted to receive and support plant growth medium and plants, having sufficient strength and rigidity when assembled to support the weight of said medium and plants, and being constructed and arranged to be joined in longitudinally-contacting relation with like modular devices to form a channel culture device extending to any desired length in the direction of said apex bends.

2. A device as recited in claim 1, said one of said inclined side walls being connected at a bend, formed at its intersection with said base segment, with a further segment extending in said one lateral direction and in parallel overlying engagement with said extended edge portion.

3. A device as recited in claim 2, said further segment being connected, at a bend spaced in said one lateral direction from said one of said inclined side walls, with a separator segment extending upwardly to approximately the height of said apex bends to subdivide said channel.

4. A device as recited in claim 3, said separator segment being inclined outwardly from said center support member to deflect rain and sunlight laterally of said channel.

5. A device as recited in claim 1, together with at least one panel having a reflective surface and constructed and arranged for partial insertion in soil received in said channel to deflect rain and sunlight laterally of said channel.

6. A device as recited in claim 1, said extended edge portion of said base segment being folded longitudinally to form a second triangular prism having segments including two inclined side walls converging upwardly and meeting in a linear apex bend of lesser height from said base segment than said first-mentioned apex bend;
at least one of the adjacent segments of said center support member being lapped over said second prism to lock said center support member against lateral disengagement from said edge support member.

7. A device as recited in claim 1, said one of said inclined side walls being connected at a bend formed, at its intersection with said base segment, with a locking segment extending in upwardly-inclined relation from said base segment;
at least one of the adjacent segments of said center support member being lapped over said locking segment to lock said center support member against lateral disengagement from said edge support member.

8. A device as recited in claim 1, each of said edge support members further including folds forming a second triangular prism extending in laterally-spaced parallel relation to said first-mentioned prism, and having a linear apex bend parallel to said first-mentioned apex bend and spaced approximately the same height above said supporting surface, to subdivide said soil channel longitudinally.

9. A device as recited in claim 1, said one of said inclined side walls being connected at a bend, formed at its intersection with said base segment, with a further segment extending within said prism in parallel overlying engagement with said base segment and in a direction opposite said one lateral direction toward the other of said inclined side walls.

10. A device as recited in claim 1, together with a plurality of partitions each receivable in one of said lower reverse bends of said center support member for subdividing said channel.

11. A device as recited in claim 1, at least one upwardly-converging adjacent pair of said alternately-inclined segments meeting in an upper reverse bend spaced above said supporting surface approximately the same height as said apex bends of said edge support members to subdivide said channel longitudinally.

* * * * *